United States Patent [19]
Yamana

[11] Patent Number: 4,606,619
[45] Date of Patent: Aug. 19, 1986

[54] REAR-VIEW MIRROR FOR VEHICLES
[75] Inventor: Tohru Yamana, Fujieda, Japan
[73] Assignee: Murakami Kaimeido Co., Ltd., Shizuoka, Japan
[21] Appl. No.: 682,049
[22] PCT Filed: Feb. 24, 1984
[86] PCT No.: PCT/JP84/00066
§ 371 Date: Nov. 27, 1984
§ 102(e) Date: Nov. 27, 1984
[87] PCT Pub. No.: WO85/00788
PCT Pub. Date: Feb. 28, 1985
[30] Foreign Application Priority Data
Aug. 12, 1983 [JP] Japan .............................. 58-124399
[51] Int. Cl.⁴ .............................................. G02B 7/18
[52] U.S. Cl. ................................. 350/604; 350/635; 248/549; 248/486; 248/478; 248/900
[58] Field of Search .............. 350/606, 604, 635, 632; 248/549, 486, 478, 477, 900; 296/84 B

[56] References Cited
U.S. PATENT DOCUMENTS
4,186,905  2/1980  Brudy ................................ 248/478
4,464,017  8/1984  Wada ................................. 350/604

FOREIGN PATENT DOCUMENTS
2232897  1/1974  Fed. Rep. of Germany ...... 350/635
48306    6/1983  Japan ................................. 350/606

Primary Examiner—Jon W. Henry

[57] ABSTRACT

A rear-view mirror mounted on an upper portion of a door panel or a door window of a vehicle. When the rear-view mirror receives a shock from forward or backward, a mirror body thereof is folded backward or forward to weaken the shock. Furthermore, when the vehicle is parked or transported, the mirror body can be easily kept in a folded state so that it occupies less space.

The rear-view mirror of the invention comprises arms 7 provided on a base 4 to which a mirror body 3 is attached, a body support 9 fastened to the inside of said mirror body 3, said arms 7 and said body support 9 being connected with each other through the intermediary of a hinge bracket 12 having hinge shafts 13 and 14 at the front and rear thereof, means for keeping said mirror body 3 in a folded state being disposed between at least one of said arms 7 and said hinge bracket 12, said means comprising projections 17a for click stop, concavities or recesses 17b corresponding to said projections 17a and a spring 19a for keeping said projections 17a fitted in said concavities or recesses 17b.

9 Claims, 6 Drawing Figures

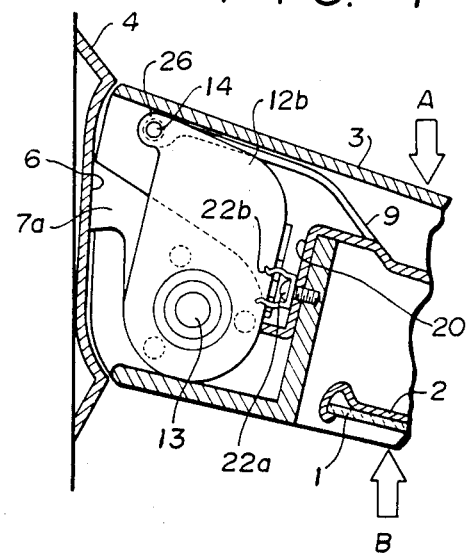
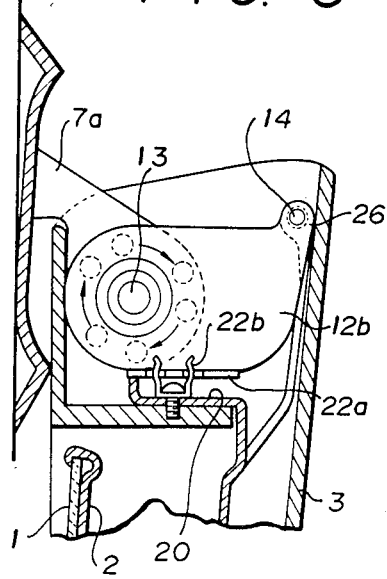
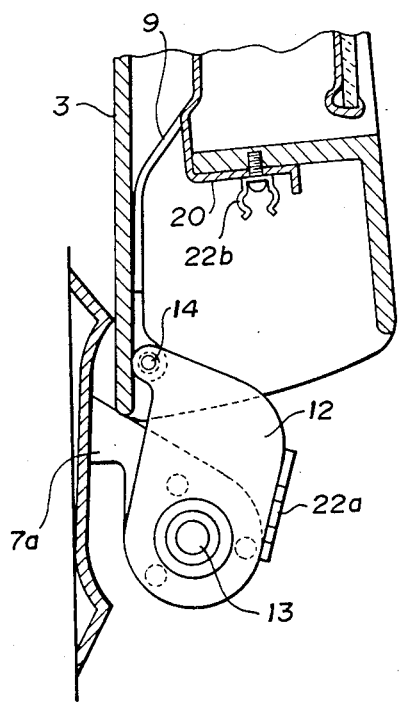

REAR-VIEW MIRROR FOR VEHICLES

TECHNICAL FIELD

The present invention relates to a rear-view mirror mounted on an upper portion of a door panel, a triangular corner of a door window or the like, of a vehicle. More particularly, the invention relates to a rear-view mirror, the mirror body of which is adapted to be folded backward or forward with respect to its base when the mirror body receives an external force from forward or backward, thereby preventing damage to persons or things.

BACKGROUND ART

In Japan, motor vehicles had rear-view mirrors generally on their fenders (Such a rear-view mirror mounted on a fender will hereinafter be referred to as a "fender mirror".). At present, many people prefer to have rear-view mirrors mounted on doors (Such a rear-view mirror mounted on a door will hereinafter be referred to as a "door mirror".) because the door mirrors look better, offer better views and are easier to adjust the mirror angle. In most of such door mirrors, a mirror body is attached to a base so that the mirror body can be folded with respect to the base. When the mirror body contacts a human body or a thing, the mirror body is folded backward or forward to weaken the shock and ensure safety. However, because the door mirror protrudes sideways from the car body more than the fender mirror, the door mirror offers problems when a vehicle equipped therewith is parked in a narrow space or shipped for transportation. Three-dimensional car parks constructed in large cities to make the most of limited spaces are designed for motor vehicles with fender mirrors and the width of each parking stall thereof is very small. Therefore, when a motor vehicle with door mirrors enters one of these car parks, a mirror body may contact a side wall, iron frame, etc. of the car park and do damage thereto as well as to the mirror body itself.

Some door mirrors already provided can be kept in a folded state so that motor vehicles equipped therewith occupy less space on board in transportation. For example, according to Japanese Utility Model Laid-Open Publication No. Sho 58-33340, a mirror body is kept in a folded state by inserting a long strip of plate between the mirror body folded backward and a base thereof. In this utility model, however, it is troublesome to insert the plate from outside to keep the mirror body in a folded state, and to remove the plate to return the mirror body to the normal position. Furthermore, the utility model has the disadvantage that the plate is liable to be lost and must be kept very carefully because it is separate from the rear-view mirror.

German Pat. No. 2219787 discloses a rear-view mirror in which a mirror body is mounted through a base having pivots at the front and rear thereof so that the mirror body can be folded forward and backward. In this rear-view mirror, however, the mirror body may be folded or vibrated or the pivots may get out of the base owing to wind pressure, slight shocks, etc. when the motor vehicle is running. To prevent that, it is necessary to attach strong tension spings between the mirror body and the base. This means that the construction of the mirror becomes complicated and it is not easy to keep the mirror body in a folded state at the time of the parking or transportation of the vehicle. Furthermore, it is necessary to strengthen the mirror body, for example, by thickening the plates thereof or disposing reinforcing members within the mirror body. Therefore, it takes more time and money to produce the mirror.

It is a general object of the invention to provide a door mirror which has obviated all the above-mentioned disadvantages of the prior art.

It is a more specific object of the invention to provide a door mirror which has means for weakening shocks when a mirror body contacts a human body, etc. during the operation of the vehicle, said mirror body being easily kept in a folded state when the vehicle is parked in a narrow space or transported.

DISCLOSURE OF THE INVENTION

In a rear-view mirror of the invention, a base for a mirror body is provided with arms in positions where the arms do not interfere with said mirror body, said mirror body being provided inside with a body support for supportion said mirror body, a hinge bracket being disposed between said body support and arms, said hinge bracket, arms and body support being connected by means of two shafts at the front and rear. When the mirror body contacts a human body or a thing and receives a strong external force thereby, the mirror body is easily folded backward or forward to prevent a shock.

Shice the front and rear shafts of the hinge bracket are supported at their both ends by the arms and body support, the mirror body is firmly held and is not easily detached from the base.

In the present invention, means for keeping the mirror body in a folded state is disposed between at least one of the arms and the hinge bracket, said means comprising projections performing click stop action, concavities or recesses into which said projections are fit, and a spring for keeping said projections fitted in said concavities or recesses. Thus, the mirror body can be kept in a folded state very easily without inserting a separate member into the mirror body. Therefore, motor vehicles equipped with rear-view mirrors of the invention occupy less space when they are parked or transported.

According to the present invention, it is not necessary to dispose members for preventing deformation within the mirror body, and therefore the mirror body can be made thin. Furthermore, since it is not necessary to attach tension springs between the mirror body and the base, the mirror has simple construction and is easy and less expensive to manufacture.

BRIEF DESCRIPTION OF THE DRAWINGS

FIGS. 4 to 6 are operational views showing the normal state and folded states of said rear-view mirror.

BEST MODE FOR CARRYING OUT THE INVENTION

Figure 1:
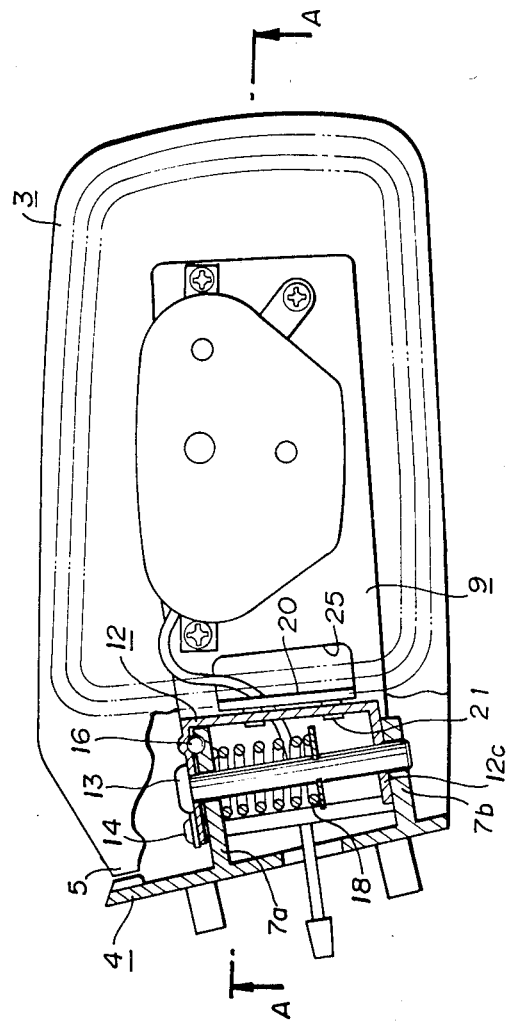
FIG. 1 is a front view of a rear-view mirror according to the present invention.
Figure 2:
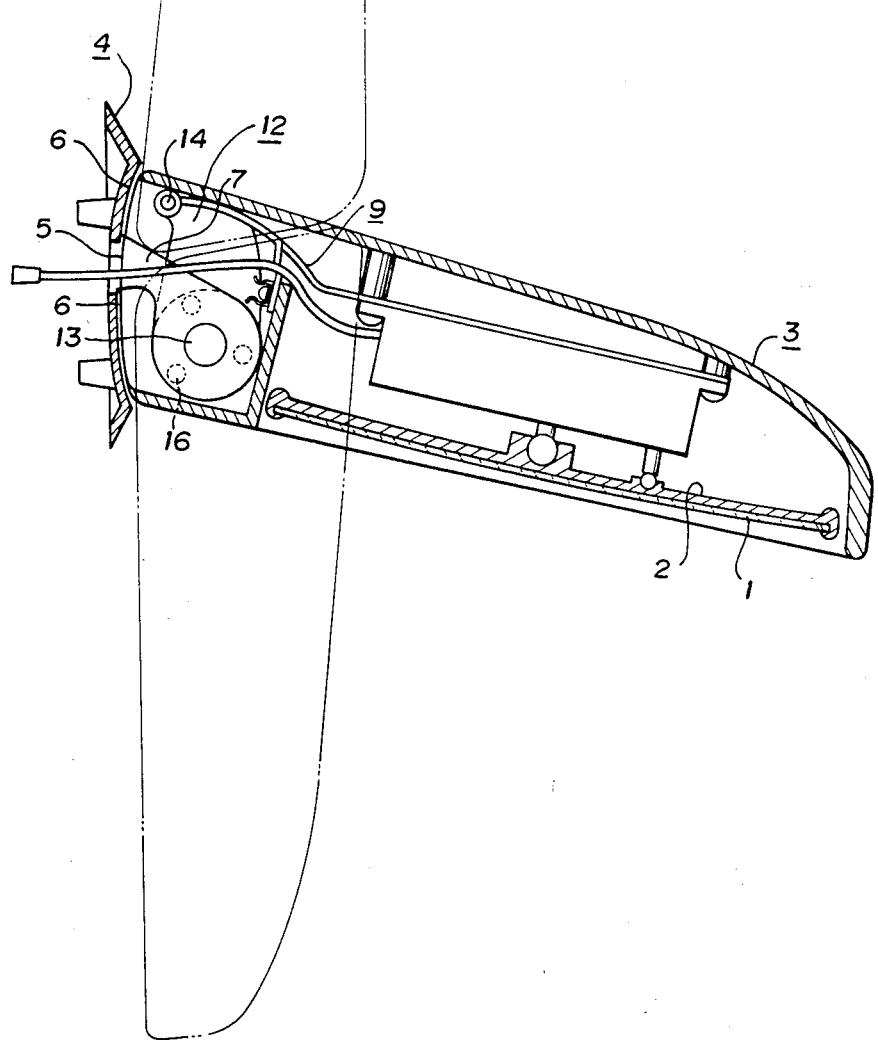
FIG. 2 is a sectional view taken on line A—A of FIG. 1.

The present invention will now be described in detail with reference to the attached drawings.

The attached drawings show an embodiment of the invention, wherein an electric mirror driving unit comprising electric motors, worm gears, etc. is disposed within a mirror body. The drawings show a rear-view mirror mounted on the right side of a vehicle. A rear-view mirror mounted on the left side is not shown in the drawings.

In the drawings, numeral 1 represents a mirror glass, numeral 2 a mirror holder, numeral 3 a mirror body, and numeral 4 a base to which a rear-view mirror is attached. The base 4 is usually fixed to a triangular corner of a door window of a vehicle. An end of the mirror body 3 facing the base 4 and a surface 6 of the base 4 facing the mirror body 3 are designed so as not to interfere with each other when the mirror body 3 is folded backward or forward.

The base 4 is provided on its surface 6 with two arms 7 consisting of an upper arm 7a and a lower arm 7b, said arms 7a and 7b respectively having shaft holes 8a and 8b. Numeral 9 represents a body support fastened to the inside of the mirror body 3 by means of screws. The body support 9 is provided at its one end with an upper bearing 10a and a lower bearing 10b respectively having shaft holes 11a and 11b.

Numeral 12 represents a hinge bracket disposed between the arms 7 and the body support 9. The hinge bracket 12 comprises a vertical plate portion 12a, and horizontal plate portions 12b and 12c respectively formed at the upper and lower ends of the vertical plate portion 12a. Hinge shafts 13 and 14, about which the hinge bracket 12 turns, are passed through the horizontal plate portions 12b and 12c as follows: The horizontal plate portions 12b and 12c are provided at their front and rear ends with shaft holes 15a, 15b, 16a and 16b. The hinge shaft 13 is inserted into the front shaft holes 15a and 15b of the hinge bracket 12 and the shaft holes 8a and 8b of the arms 7, both ends of said hinge shaft 13 being supported by the upper arm 7a and the lower arm 7b. Thereby, the hinge bracket 12 is swingingly connected to the base 4. The hinge shaft 14 is inserted into the rear shaft holes 16a and 16b of the hinge bracket 12 and the shaft holes 11a and 11b of the body support 9, both end of said hinge shaft 14 being supported by the upper bearing 10a and the lower bearing 10b. Thereby, the body support 9 and the hinge bracket 12 are swingingly connected to each other.

Means for keeping the mirror body 3 in a folded state is disposed between at least one of the arms 7 and the hinge bracket 12, said means comprising a plurality of projections 17a provided on at least one of the arms 7, a plurality of concavities or recesses 17b provided on the hinge bracket 12 so as to correspond to the projections 17a, and spring means 18 for keeping said projections 17a fitted in said concavities or recesses 17b. In an embodiment illustrated in the drawings, the projections 17a comprise three small balls half buried in the upper surface of the upper arm 7a, said balls being disposed at regular intervals concentrically around the shaft hole 8a. The concavities or recesses 17b comprise a plurality of click stop engagement holes into which the projections 17a can be fitted, said holes being formed in the lower surface of the upper horizontal plate portion 12b facing said projections 17a. The spring means 18 comprises a compression coiled spring 19a disposed around the hinge shaft 13, and a push nut 19b through which the bottom of the spring 19a is fixed to the hinge shaft 13.

Figure 3:
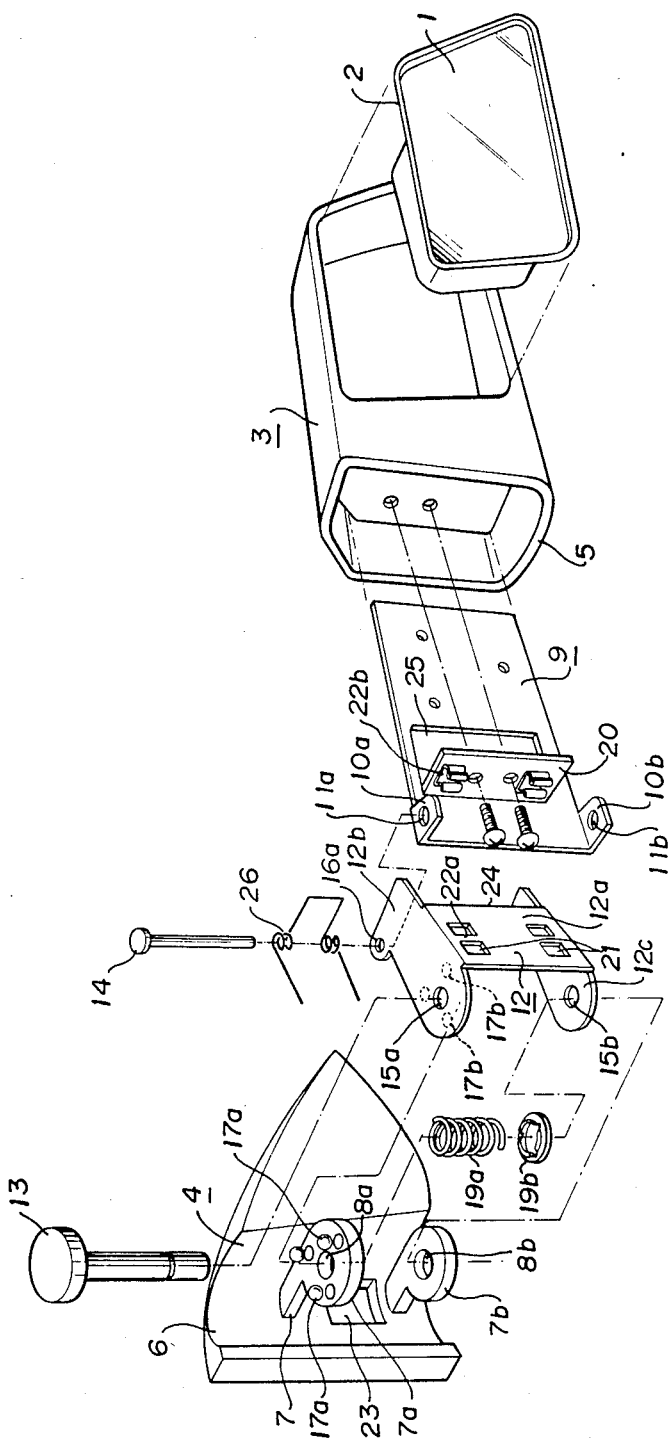
FIG. 3 is an exploded view of said rear-view mirror.

As shown in FIG. 3, the main portion of the body support 9 has a projecting portion 20 perpendicular thereto. Clamp means 21 for controlling the relative motion between the mirror body 3 and the hinge bracket 12 is provided between the projecting portion 20 of the body support 9 and the vertical plate portion 12a of the hinge bracket 12. The clamp means 21 comprises at least one insert 22a and at least one holder 22b elastically engageable with each other. In the embodiment illustrated in the drawings, each of the inserts 22a is formed by making holes 21 in the vertical plate portion 12a of the hinge bracket 12, and elastic holders 22b corresponding to the inserts 22a are fastened to the projecting portion 20 of the body support 9 by means of screws.

Numeral 23 represents an opening in the base 4, through which the harness of the actuators for adjusting the angle of the mirror glass 1 and other operation members are passed. Numeral 24 represents a cut in the hinge bracket 12, and numeral 25 an opening in the body support 9. The hinge shaft 14 is provided around it with a torsion spring 26. When the mirror body 3 is folded forward, the torsion spring 26 returns the mirror body 3 toward its original position and prevents it from rattling.

The operation of the rear-view mirror will now be described.

In FIGS. 1 and 4 showing the rear-view mirror in the normal state, the lower surface of the upper horizontal plate portion 12b of the hinge bracket 12 is brought into pressing contact with the upper surface of the upper arm 7a by the force of the coiled spring 19a disposed around the hinge shaft 13. In this state, said projections 17a are fitted in the concavities or recesses 17b of the hinge bracket 12 so that the mirror body 3 is suitably held in place.

When the mirror body 3 receives a strong force from outside, the mirror body 3 is folded backward or forward as follows by the action of the hinge bracket 12 to avoid the shock. That is, when the mirror body 3 receives a force from forward (in the direction of the arrow A in FIG. 4), the coiled spring 19a is compressed, the projections 17a getting out of the concavities or recesses 17b, the hinge bracket 12 turning about the hinge shaft 13, thereby the mirror body 3 being folded backward as shown in FIG. 5. The mirror body 3 is kept in the folded state by the elastic action of the coiled spring 19a. When the mirror body 3 receives a force from backward (in the direction of the arrow B in FIG. 4), the inserts 22a are disengaged from the holders 22b, and the mirror body 3 is turned about the hinge shaft 14 and folded forward as shown in FIG. 6.

If it is necessary to keep the mirror body 3 in a folded state as in parking or shipping the vehicle, the mirror body 3 in the state shown in FIG. 4 is slowly pushed backward against the force of the coiled spring 19a. Then, the coiled spring 19a is compressed, the projections 17a get out of the concavities or recesses 17b, the hinge bracket 12 turns, and the mirror body 3 turns backward. When the mirror body 3 is stopped in a position shown in FIG. 5, the mirror body 3 is kept in the folded state by the click stop action of the projections 17a, concavities or recesses 17b and coiled spring 19a.

When the parking or transportation of the vehicle is finished, the mirror body 3 can be returned to its original position shown in FIG. 4 by turning the mirror body 3 against the force of the coiled spring 19a.

As mentioned above, when the mirror body 3 hits a pedestrian or a thing or when it is necessary to keep the rear-view mirror in the inside of the external line of the vehicle, the mirror body 3 is folded from the state shown in FIG. 4 to the state shown in FIG. 5 or 6. Therefore, it is possible to minimize damage to the person or things as well as to the rear-view mirror itself.

What is claimed is:

1. A rear-view mirror, the mirror body of which is attached to its base so that said mirror body can be folded backward or forward with respect to said base, comprising arms provided on said base, a body support fastened to the inside of said mirror body, said arms and said body support being connected with each other through the intermediary of a hinge bracket having two hinge shafts at the front and rear thereof, and means for keeping said mirror body in a folded state being disposed between at least one of said arms and said hinge bracket.

2. A rear-view mirror as claimed in claim 1, wherein both ends of one of said hinge shafts are supported by an upper arm and a lower arm provided on said base, and both ends of the other hinge shaft are supported by an upper bearing and a lower bearing provided on said body support.

3. A rear-view mirror as claimed in claim 1, wherein said means for keeping said mirror body in a folded state comprises projections for click stop being provided on either of said hinge bracket on at least one of said arms, concavities or recesses corresponding to said projections being provided on the other thereof, and spring means for keeping said projections fitted in said concavities or recesses.

4. A rear-view mirror as claimed in claim 3, wherein said projections and said concavities or recesses are disposed concentrically around one of said hinge shafts connecting said hinge bracket with said arms, said hinge shaft being provided with a coiled spring for bringing said hinge bracket into pressing contact with said arms.

5. A rear-view mirror as claimed in claim 1, wherein clamp means for controlling the relative motion between said body support and said hinge bracket is provided between said body support and said hinge support.

6. A rear-view mirror as claimed in claim 5, wherein said clamp means comprises at least one insert provided on either of said body support or said hinge bracket, and at least one holder provided on the other thereof, said insert being elastically engageable with said holder.

7. A rear-view mirror as claimed in claim 1, wherein said hinge bracket comprises a vertical plate portion, and horizontal plate portions respectively formed at the upper and lower ends of said vertical plate portion.

8. A rear-view mirror as claimed in claim 1, wherein said hinge shaft at the rear of said hinge bracket is provided with a torsion spring for preventing said mirror body from rattling.

9. A rear-view mirror as claimed in claim 1, wherein said base, said hinge bracket and said body support have an opening through which operation members are passed.

* * * * *